United States Patent [19]

Robin et al.

[11] 4,021,366

[45] May 3, 1977

[54] PRODUCTION OF HYDROGEN-RICH GAS

[75] Inventors: Allen M. Robin, Anaheim, Calif.;
Edward T. Child, Tarrytown, N.Y.

[73] Assignee: Texaco Inc., New York, N.Y.

[22] Filed: June 30, 1975

[21] Appl. No.: 592,132

[52] U.S. Cl. .................... 252/373; 423/655 423/656
[51] Int. Cl.² ........................ C01B 2/06; C01B 2/10
[58] Field of Search ............ 423/655, 656; 252/373

[56] References Cited

UNITED STATES PATENTS

| | | | |
|---|---|---|---|
| 2,465,235 | 3/1949 | Kubicek | 252/373 UX |
| 2,593,584 | 4/1952 | Lynch | 252/373 |
| 3,345,136 | 10/1967 | Finnevan et al. | 423/656 |
| 3,361,534 | 1/1968 | Johnson et al. | 423/656 X |
| 3,392,001 | 7/1968 | Lorenz et al. | 423/656 |
| 3,652,454 | 3/1972 | Robin | 252/373 |
| 3,666,682 | 5/1972 | Muenger | 252/373 |
| 3,720,625 | 3/1973 | Kapp et al. | 252/373 |
| 3,850,840 | 11/1974 | Aldridge et al. | 252/373 |
| 3,890,113 | 6/1975 | Child et al. | 252/373 |

FOREIGN PATENTS OR APPLICATIONS

| | | | |
|---|---|---|---|
| 1,080,295 | 8/1967 | United Kingdom | 423/656 |
| 1,302,135 | 1/1973 | United Kingdom | 252/373 |

*Primary Examiner*—Howard T. Mars
*Attorney, Agent, or Firm*—Thomas H. Whaley; Carl G. Ries; Albert Brent

[57] ABSTRACT

This is a continuous process for producing hydrogen-rich gas. Successive beds of water-gas shift conversion catalysts of differing properties are employed in a shift converter to achieve an economical balance between catalyst activity and catalyst life. For example, a comparatively small fixed bed of highly active low temperature water-gas shift conversion catalyst may be loaded on top of a fixed bed of rugged low cost moderately active high temperature water-gas shift catalyst. A CO-rich gas and $H_2O$ are introduced into the bed of low temperature shift catalyst where reaction takes place. The partially reacted gas stream leaves the bed of low temperature shift catalyst and is introduced into the bed of high temperature catalyst at a suitable temperature for triggering off therein the water gas shift reaction without the additon of heat from an external source. By this means it may be possible to produce hydrogen-rich gas with high conversions of CO to $CO_2$, and to increase catalyst life at a moderate cost. It may also be possible to eliminate a feed heater or feed-product heat exchanger.

14 Claims, 1 Drawing Figure

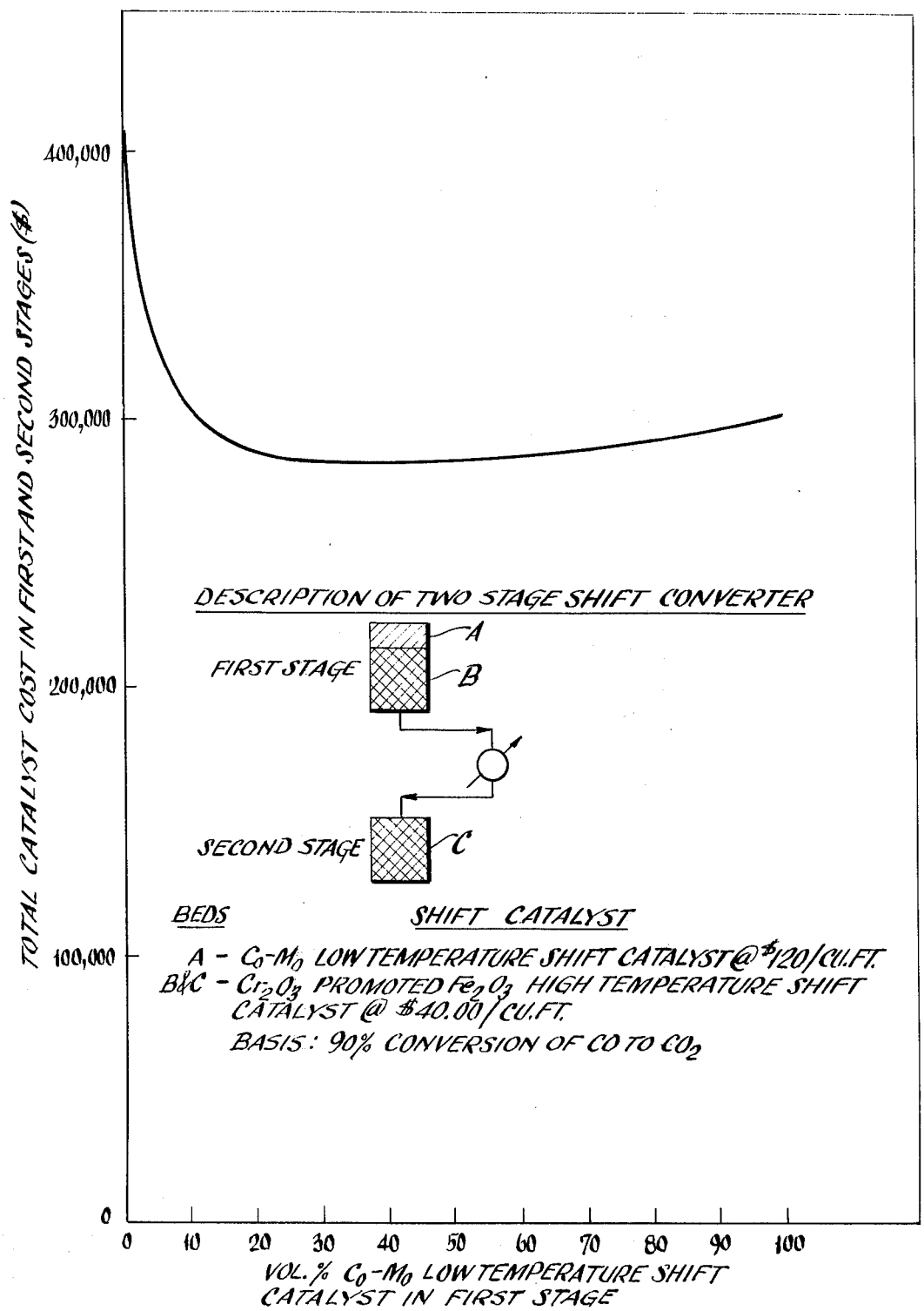

PRODUCTION OF HYDROGEN-RICH GAS

BACKGROUND OF THE INVENTION

1. Field of the Invention

This invention relates to a continuous process for the production of hydrogen-rich gas. More specifically, the present invention pertains to reacting a stream of raw synthesis gas in a multi-bed catalytic water-gas shift converter to increase the hydrogen content.

2. Description of the Prior Art

Hydrogen gas may be obtained by the catalytic reaction of carbon monoxide and steam. This reaction is exothermic, liberating approximately 16,400 Btu per mole of carbon monoxide converted. It is commonly referred to as the water-gas shift reaction and is shown in Equation 1 below.

$$CO + H_2O \rightarrow CO_2 + H_2 \qquad (1)$$

A typical conventional water-gas shift catalyst is iron oxide promoted by chromium oxide. This catalyst is referred to commonly as a high temperature shift catalyst because it has an ignition temperature in the range of about 600° to 710° F. The effluent gas stream leaving a reaction zone containing high temperature shift catalyst is at a temperature in the range of about 715° to 1000° F.

$CrO_2$ promoted $Fe_2O_3$ shift catalyst is relatively low priced, readily available, and its strength is high at the high temperatures which exist at the exit of the catalyst bed. However, a serious disadvantage is that the reaction rate of iron oxide catalysts at low temperatures is comparatively slow. Accordingly, the inlet temperature of the reactants must be at a minimum of about 600° F.

SUMMARY

This is a process for the production of a hydrogen-rich gas stream which comprises 1. optionally mixing supplemental $H_2O$ with a CO-containing gas stream;
2. contacting a low temperature water-gas shift catalyst in a shift conversion zone with the gas mixture from (1) at a temperature in the range of about 350° to 550° F., and reacting together a portion of the CO and $H_2O$ in said gas mixture;
3. removing the process gas stream from the low temperature water-gas catalyst;
4. introducing the process gas stream from (3) into a bed of high temperature water-gas shift catalyst at a suitable temperature for triggering off the water-gas shift reaction without the addition of heat from an external source, and reacting therein $H_2O$ and CO in said process gas stream; and
5. removing a gas stream from (4) at a temperature in the range of about 715° to 1000° F. enriched in hydrogen and containing carbon dioxide.

Preferably, the low temperature shift catalyst comprises cobalt molybdenate, and the high temperature shift catalyst comprises chromium oxide promoted iron oxide.

DESCRIPTION OF THE INVENTION

In the subject process, a CO-rich feed gas stream is mixed with supplemental $H_2O$ and the mixture is then introduced into a catalytic reaction zone where the water-gas shift reaction takes place to produce $H_2$ and $Co_2$. About 1 to 5 moles of steam are mixed with each mole of Co entering the shift converter. Preferably, the CO-rich feed gas stream (also referred to herein as synthesis gas) is obtained by the partial oxidation of a hydrocarbonaceous fuel. It may be also made by catalytic steam reformation of liquid hydrocarbons such as naphtha. However, the cost of such feedstocks are greater than the cost of the feedstock used in the preferred partial oxidation process. Further, steam reforming catalysts are generally expensive.

Raw synthesis gas feed used in the subject process comprises gaseous mixture of $H_2$, CO, $CO_2$, $H_2O$, particulate carbon, and optionally at least one gas selected from the group $CH_4$, $H_2S$, COS, $N_2$, and A. The synthesis gas is preferably made by the partial oxidation of a hydrocarbonaceous fuel in a noncatalytic free-flow synthesis gas generator. For example, a pumpable slurry of coal or a liquid-hydrocarbon fuel feedstock such as petroleum oil, is reacted with a free-oxygen containing gas such as substantially pure oxygen, oxygen-enriched air, or air in the presence of a temperature moderator such as $H_2O$ or $CO_2$ at an autogenously maintained temperature within the range of about 1300° to 3500° F. and at a pressure in the range of about 1 to 250 atmospheres, and preferably 8 to 135 atmospheres.

The gas generator for carrying out the partial oxidation reaction in the subject process preferably consists of a compact, unpacked, free-flow non-catalytic, refractory lined steel pressure vessel of the type described in coassigned U.S. Pat. No. 2,809,104 issued to D. M. Strasser et al, which patent is incorporated herewith by reference. The effluent gas stream from the gas generator may have the following composition in mole %: $H_2$ 20 to 70; CO 60 to 20; $CO_2$ 3 to 8; $H_2O$ 5–15; $CH_4$ nil to 15; $N_2$ nil to 60; $H_2S$ nil to 2.0; COS nil to 0.2; A nil to 2; and from 0.2 to 20 wt. % of particulate carbon (basis weight of C in the hydrocarbonaceous fuel).

The free-oxygen containing gas may be selected from the group consisting of air, oxygen-enriched air (22 mole percent $O_2$ and higher), and preferably substantially pure oxygen (95 mole percent $O_2$ and higher). The amount of nitrogen in the product gas may be substantially reduced or eliminated by using substantially pure oxygen.

Preheating of the reactants is optional but generally desirable. For example, a hydrocarbon oil and steam may be preheated to a temperature in the range of about 100° to 800° F. and the oxygen may be preheated to a temperature in the range of about 100° to 1000° F.

A wide variety of hydrocarbonaceous fuels is suitable as feedstock for the partial oxidation process, either alone, or in combination with each other or with particulate carbon. The hydrocarbonaceous feeds include fossil fuels such as: various liquid hydrocarbon fuels including petroleum distillates and residua, naphtha, gas oil, residual fuel, reduced crude, fuel oil, whole crude, coal tar oil, shale oil, tar sand oil, and mixtures thereof. Suitable liquid hydrocarbon fuel feeds as used herein are by definition liquid hydrocarbonaceous fuel feeds that have a gravity in degrees API in the range of about −20 to 100.

Pumpable slurries of solid carbonaceous fuels, i.e., lignite, bituminous and anthracite coals, coal char, particulate carbon, petroleum coke, and mixtures thereof in water or in said liquid hydrocarbon fuels are included herewith as within the scope of the definition for hydrocarbonaceous fuel feeds.

Further, included also by definition as a hydrocarbonaceous fuel are liquid oxygenated hydrocarbonaceous material i.e. liquid hydrocarbon materials containing combined oxygen, including alcohols, ketones, aldehydes, organic acids, ester, ethers, and mixtures thereof. Further, a liquid oxygenated hydrocarbonaceous material may be in admixture with one of said liquid petroleum materials.

It is normal to produce from hydrocarbonaceous fuel feeds by partial oxidation about 0.2 to 20 weight percent of free carbon soot (on the basis of carbon in the hydrocarbonaceous fuel feed). The free carbon soot is produced in the reaction zone of the gas generator for example, by cracking hydrocarbonaceous fuel feeds. Carbon soot will prevent damage to the refractory lining in the generator by constituents which are present as ash components in residual oils. With heavy crude or fuel oils it is preferable to leave about 1 to 3 weight percent of the carbon in the feed as free carbon soot in the product gas. With lighter distillate oils, progressively lower carbon soot yields are maintained.

The amount of soot in the product synthesis gas may be controlled primarily by regulating the oxygen to carbon ratio (O/C, atom/atom) in the range of 0.7 to 1.5 atoms of oxygen per atom of carbon in the feed, and to some extent by regulating the weight ratio of $H_2O$ to hydrocarbonaceous fuel feed in the range of 0.15 to 3.0 pounds of $H_2O$ per pound of fuel. In the above relationship, the O/C ratio is to be based upon (1) the total of free-oxygen atoms in the oxidant stream plus combined oxygen atoms in the hydrocarbonaceous fuel feed molecules and (2) the total of carbon atoms in the hydrocarbonaceous fuel feed plus carbon atoms in recycled particulate carbon (soot). For example, at a constant oil feed rate, the entire operating range of about 1 percent to about 4 percent soot yield may be obtained by only a 6 percent change in the oxygen feed rate.

$H_2O$ is preferably introduced into the reaction zone to help control the reaction temperature, to act as a dispersant of the hydrocarbonaceous fuel fed to the reaction zone, and to serve as a reactant to increase the relative amount of hydrogen produced. Other suitable temperature moderators include $CO_2$-rich gas, a cooled portion of effluent gas from the gas generator, cooled off-gas from an integrated ore-reduction zone, nitrogen, and mixtures thereof.

In one embodiment of our invention, the hot gaseous effluent from the reaction zone of the synthesis gas generator may be quickly cooled below the reaction temperature to a temperature in the range of 180° to 700° F. For example, cooling water may be contained in a carbon-steel quench vessel or chamber located immediately downstream from the reaction zone of said gas generator. A large diameter dip leg starting at the bottom end of the reaction zone and discharging beneath the water level in the quench chamber serves as an interconnecting passage between the reaction zone and the quench zone through which the hot product gases pass. This passage also serves substantially to equalize the pressure in the two zones. A concentric draft tube, open on both ends, surrounds said dip leg. An annulus is created through which a mixture of quenched gas and water rises vigorously and splashes against the support plate of the reactor floor. The water and gas then separate in the quench chamber in the space outside the draft tube. This circulation of water through the draft tube system maintains the entire quench system at essentially the temperature of the water leaving the quench vessel, which is also the temperature of the saturated steam in the quench zone.

Recycle water from the carbon-scrubbing zone, to be further described, is normally introduced through a quench ring at the top of the dip-leg to cool the metal at that point. Large quantities of steam are generated in the quench vessel, and the quench chamber may be likened to a high output high pressure boiler.

The turbulent condition in the quench chamber, caused by the large volume of gases bubbling up through said annular space, helps the water to scrub a large part of the solids from the effluent gas so as to form a dispersion of unconverted particulate carbon and quench water. Further, steam required for the subsequent shift conversion step is picked up by the effluent synthesis gas during quenching. For a detailed description of the quench chamber, reference is made to coassigned U.S. Pat. No. 2,896,927 issued to R. E. Nagle et al, which is herewith incorporated by reference. Any residual solids in the cooled and scrubbed effluent synthesis gas leaving the quench chamber may be removed by means of a conventional venturi or jet scrubber, such as described in Perry's Chemical Engineers' Handbook, Fourth Edition, McGraw-Hill Co., 1963, pages 18-55 to 56.

Alternately, the hot effluent gas stream from the reaction zone of the synthesis gas generator may be cooled to a temperature in the range of about 240° to 700° F. by indirect heat exchange in a waste heat boiler. The entrained solid particles may be then scrubbed from the effluent synthesis gas by contacting and further cooling the effluent stream of synthesis gas with quench water in a gas-liquid contact apparatus, for example, a quench dip-leg assembly, a spray tower, venturi, or jet scrubber, bubble plate contactor, packed column, or in a combination of said equipment. For a detailed description of cooling synthesis gas by means of a waste heat boiler and a scrubbing tower, reference is made to coassigned U.S. Pat. No. 2,980,523 issued to R. M. Dille et al and incorporated herewith by reference.

It is desirable to maintain the concentration of particulate carbon in the gas cooling and scrubbing water streams in the range of about 0.5 to 2 wt. % and preferably below about 1.5 wt. %. In this manner, the dispersion of carbon in water will be maintained sufficiently fluid for easy pumping through pipelines and for further processing.

The temperature in the scrubbing zone is in the range of about 180° to 700° and preferably in the range of about 350°–550° F. The pressure in the scrubbing zone is in the range of about 1–250 atmospheres, and preferably at least 8 atmospheres. Suitably the pressure in the scrubbing zone is about the same as that in the gas generator, less ordinary pressure drop in the lines.

It is important with respect to the economics of the process that the particulate carbon be removed from the carbon-water dispersion and the resulting clear water to be recycled and reused for cooling and scrubbing additional particulate carbon from the effluent gas stream from the gas generator.

Optionally, after the raw effluent gas stream from the gas generator is passed through the scrubbing zone to remove particulate carbon and any other entrained solid particles, all or a portion of the CO-rich gas stream produced comprising 20 to 60 mole % of CO may be mixed with supplemental $H_2O$ (if necessary) to provide a mole ratio $H_2O/CO$ in range of about 1 to 5. The process gas stream may be then introduced into a catalytic water-gas shift conversion zone where CO and $H_2O$ react to produce $H_2$ and $CO_2$.

The catalytic water-gas shift conversion zone comprises a steady-state continuous flow fixed-bed reactor comprising a plurality of separate catalyst beds in series.

Low temperature and high temperature types of water-gas shift catalyst may be employed in said catalytic water-gas shift conversion zone in one to three stages. The reactor may contain as a first stage a bed of low temperature shift catalyst in contact with a first bed of high temperature shift catalyst. Optionally, a second bed of high temperature shift catalyst may follow the first bed of high temperature shift catalyst and constitute the second stage. Optionally, a third stage constituting a bed of low temperature shift catalyst may follow the second stage.

More specifically in the first stage of a one- or two-stage embodiment, the CO-rich feed gas stream at a temperature in the range of about 350° to 550° F and at a pressure in the range of about 1 to 250 atmospheres such as 8 to 135 atmospheres and preferably that of the gas generator less any normal pressure drop in the lines and equipment is introduced into a fixed bed of low temperature water-gas shift catalyst comprising for example cobalt-molybdenum. About 10 to 50 mole percent of the CO in said feed gas stream is reacted in said first bed, and the temperature of the process gas stream is increased to a temperature in the range of about 600° to 840° F, and preferably about 600° to 710° F. The space velocity is in the range of about 5,000 to 10,000 SCFH per Ft.$^3$ of catalyst. The effluent gas stream leaving the low temperature catalyst is introduced without additional heating directly into a bed of high temperature water-gas shift catalyst. The high temperature catalyst comprises, for example, iron oxide promoted by chromium oxide; and it is contained in a serially connected fixed bed.

The temperature of the partially reacted process gas stream leaving the first bed of low temperature shift catalyst in the first stage is preferably suitable for triggering off the water-gas shift reaction in the bed of high temperature shift catalyst in the first stage without the addition of any supplemental heat from an external source and preferably without cooling. The process gas stream is preferably introduced into the bed of high temperature catalyst in the first stage at a space velocity of at most 4000 SCFH per cubic foot of catalyst, and preferably in the range of about 1000 to 4000 SCFH per Ft$^3$ of catalyst. Further, the rate of reaction in said bed of high temperature shift catalyst in the first stage is such that about 80 mole % of the CO in the process gas stream is converted to $CO_2$.

The partially reacted process gas stream at the exit temperature from the first bed of low temperature catalyst in the first stage is passed directly into the first bed of high temperature shift catalyst. In the first stage, this may be done effectively in one vessel containing two contiguous layers of catalyst. For example, the volumetric ratio of low tempeature shift catalyst to high temperature shift catalyst is in the range of about 0.05 to 0.50. A screen may be inserted at the interface of the two catalysts. Alternatively, the beds of low temperature and high temperature shift catalyst may be contained in two separate chambers connected in series.

The effluent gas stream leaving the bed of high temperature catalyst in the first stage is enriched in hydrogen and carbon dioxide. The temperature of this gas stream is in the range of about 710° to 1000° F, and the pressure is substantially that of the gas generator less normal pressure drop in the lines equipment, and across the catalyst beds.

Optionally, in a two-stage embodiment a second stage may be added to the previously described single stage embodiment. The second stage comprises a second fixed bed of high temperature catalyst. Cooling of the process gas stream may take place betweeen the first and second stages to 600°–710° F. Cooling may be effected by either external cooling of the reactant gas mixture between stages by indirect heat exchange with $H_2O$; directly introducing water or some other coolant into the space between the first and second beds of high temperature catalyst; or by preheating the feed to the first bed of the first stage by indirect heat exchange with the process gas stream leaving the first-stage in an external heat exchanger. The space velocity in the second stage is in the range of about 1000 to 4000 SCFH per Ft$^3$ of catalyst. The pressure is in the range of about 1–250 Atm. e.g. 8–135 Atm., and is preferably that in the gas generator, less ordinary pressure drop in the lines. The mole ratio $H_2O/CO$ is in the range of about 1 to 5.

Optionally, a third stage may be added to the beforesaid two-stage embodiment. The third stage comprises a second fixed bed of low temperature catalyst. By this means, the CO conversion may be extended to a range of about 95–98 percent. In such cases, the effluent gas stream leaves the second stage at a temperature in the range of about 710° to 1000° F and is cooled to a temperature of about 350° to 550° F before being introduced into the third stage at a space velocity in the range of about 5000 to 10,000 SCFH per Ft$^3$ of catalyst. The pressure in the third stage reactor is in the range of about 1–250 Atm. e.g. 8–135 Atm., and is preferably that in the gas generator less ordinary pressure drop in the lines. The mole ratio $H_2O/CO$ in the third stage is in the range of about 1–5. The effluent gas temperature from the third stage is in the range of about 600° to 840° F, such as 600° to 710° F.

Typical conventional low temperature water-gas shift catalysts include cobalt molybdenate (Co-Mo) on alumina, and copper-zinc oxides.

For example, the Co-Mo catalyst may have a chemical composition in Wt. %, as follows: CoO 2.0–5.0, $MoO_3$ 8.0–16.0, MgO nil-20.0, $Al_2O_3$ 55–85.0.

The average size in inches of the pellets of Co-Mo catalyst is in the range of about 1/16 – 3/16 diameter by 3/16 – ⅜ long. Bulk density in lbs. per cu. ft. is in the range of about 30 – 50. Surface area in square meters per gram is in the range of about 150 – 350. Preferably, at least 0.1 mole % $H_2S$ (dry gas basis) should be present in the feed gas to the shift converter to attain maximum activity. Peak performance may be obtained by maintaining 4 – 6% by weight of sulfur on the catalyst.

Conventional copper-zinc low temperature shift catalyst may comprise mixtures of copper and zinc salts or oxides in a weight ratio of about 3 parts zinc to 1 part copper. This catalyst may be used when the CO-rich feed gas stream contains less than about 10 parts per million (ppm) of sulfur and chlorides. Accordingly, prior to shifting, if the process gas stream contains $H_2S$ plus COS in large amounts, it may be treated by conventional means to remove sulfur. Residual sulfur in the process gas stream may be removed by desulfurization with zinc oxide. In this manner, the life of the catalyst may be extended. Cu-Zn low temperature shift catalyst is very active at a temperature in the range of about 350° to 500° F.

A typical conventional high temperature water-gas shift catalyst is iron oxide promoted by 1–15 weight percent of an oxide from the group chromium, thorium, uranium, beryllium and antimony. It may be obtained in the form of pellets or irregular fragments that range in size from about 5 to 10 mm and larger, or tablets ranging from ¼ in. to ⅜ in. diameter by ¼ to ½ in. long. Bulk density in lbs. per cu. ft. is in the range of about 70–80. Surface area in square meters per gram is in the range of about 70–120.

The Co-Mo low temperature shift catalyst has the advantage over the high temperature shift catalyst of being very active at lower temperature, i.e., 500° to 550° F. However, it has the disadvantages of being less resistant to high temperatures encountered at the exit of the bed, and it is about three times more expensive. The use of lower inlet temperature is a highly desirable feature since it permits a much better control of the operation of the system with resultant higher overall average yields of desired products. Better control is achieved by using the effluent of the first stage to preheat the inlet feedstream to the first stage, thus uncoupling the last one or two beds from the control loop. By producing the clean CO-rich gas at a high enough temperature for introducing into said first stage, no preheat at all is necessary. Heat exchangers and preheaters may be avoided at a cost savings. A process which is much simpler to control is thereby achieved.

By operating the gas generator at a pressure in the range of about 120 to 2000 psig and quenching the effluent gas stream in a quench tank, a process gas stream is produced with a temperature in the range of about 350° to 550° F. By selecting the proper low temperature shift catalyst for the first stage, it is then possible to eliminate the heat exchanger used to preheat or cool the feed gas stream to the first shift converter bed.

The $Cr_2O_3$ promoted $Fe_2O_3$ high temperature catalyst is relatively low priced, commercially available, and has high strength that resists the high temperatures at the exit of the bed. However, it has the disadvantage of a low reaction rate at low temperatures. This limits the inlet temperature of the reactants to a minimum of about 600° F.

By applicants' process, successive beds of low temperature and high temperature water gas shift catalysts of differing properties hve been employed to achieve an economical balance between catalyst activity and catalyst life. Thus, it was unexpectedly found that by preceding a moderately priced high temperature bed of shift catalyst with a bed of expensive low temperature shift catalyst, the total catalyst cost may be substantially reduced. Further, the need for a feed preheater or feed-product exchanger may be eliminated and overall conversion may be improved.

EXAMPLES

The following examples are offered as a better understanding of the present invention, but the invention is not to be construed as limited thereto.

EXAMPLE 1

A single train water-gas shift converter contains a total volume of 6400 cubic feet of two types of water gas shift catalyst in two stages.

The first stage comprises two contiguous beds of shift catalyst. The first bed comprises 500 cubic feet of Co-Mo low temperature water-gas shift catalyst; and it is located on top of a second bed comprising 3100 cubic feet of chromium oxide promoted iron oxide shift catalyst. A screen may separate the first and second beds of shift catalyst. Cooling means is provided for reducing the temperature of the effluent gas stream from the first stage.

The second stage comprises a single bed of shift catalyst which is separated from said first stage. This last bed comprises 2800 cubic feet of chromium oxide promoted iron oxide shift catalyst, such as the type used in said second bed.

The composition of the low temperature shift catalyst in said first bed comprises in weight percent CoO 3.5, $MoO_3$ 14.0, and $Al_2O_3$ 82.5. It has a surface area of about 300 m²/g, and a bulk density of about 35 lbs. per cu. ft. It is supplied in the form of solid cylindrical pellets ⅛ inch diameter × ¼ inch long. The reaction rate for the Co-Mo catalyst may be expressed by the following equation:

$$k = e^{(18.334 - 9,500/T)}$$

where $T$ is in $°R$.

The high temperature catalyst in beds 2 and 3 comprises in weight percent: $Fe_2O_3$ 85 and $Cr_2O_3$ 15. It has a surface area of about 100 m²/g, and a bulk density of about 70 lbs. per cu. ft. The catalyst is supplied in the form of solid cylindrical pellets ¼ × ¼ inch. The reaction rate for the chromium oxide promoted iron oxide catalyst may be expressed by the following equation:

$$k = e^{(22.79 - 16,000/T)}$$

where $T$ is in $°R$.

A stream of raw synthesis gas is produced by the partial oxidation of California reduced crude oil with substantially pure oxygen and steam in a noncatalytic free flow gas generator at a pressure of about 1500 psig and a temperature of about 2600° F.

The effluent gas stream from the synthesis gas generator is quenched in water in a quench tank, as previously described. Any remaining particulate carbon is removed by scrubbing with water. The $H_2O$-saturated CO-rich process gas stream leaves the scrubbing zone at a temperature of about 500° F with the composition shown in Table 1. 8000 moles per hour (basic dry feed gas) of this gas stream are introduced directly into the first bed containing said low temperature shift catalyst. The inlet temperature is 500° F, and the $H_2O/CO$ mole ratio is 1.2. The highly exothermic water gas shift reaction between CO and $H_2O$ takes place in the first bed of catalyst, thereby producing $H_2$ and $CO_2$ and increasing the temperature of the process gas stream. The conversion of CO to $CO_2$ is about 26 percent.

The process gas stream leaves the first bed of low temperature shift catalyst at a temperature of 600° F and with the composition shown in Table 1. This stream is then introduced directly into the second catalyst bed containing high temperature shift catalyst. It is unnecessary to heat or cool the process gas stream at this point in the process since it leaves the bed of low temperature catalyst at the proper temperature for triggering off the water gas shift reaction in the second bed containing high temperature shift catalyst.

The water-gas shift reaction continues taking place as the process gas stream passes through the second bed containing high temperature catalyst, and the temperature of the process gas stream rises to 820° F at the exit from the second bed. The conversion of CO to $CO_2$ through the first stage is about 85 percent.

The maximum possible conversion of CO to $CO_2$ in the water-gas shift reaction at any temperature varies inversely with the reaction temperature. Accordingly, in the second stage of the process, the process gas stream leaving the second bed comprising high temperature catalyst is cooled to a temperature of about 684° F before it is introduced into the second stage comprising a single bed of high temperature shift catalyst where the shift reaction continues. The process gas stream leaves the last bed of shift catalyst at a temperature of about 709° F, and with the composition shown in Table I. The conversion of CO to $CO_2$ is about 5 percent. The overall conversion of CO to $CO_2$ is about 90%.

TABLE 1

| | GAS COMPOSITION FIRST STAGE | | SECOND STAGE |
|---|---|---|---|
| | Inlet to Low Temp. Shift Catalyst | Outlet from Low Temp. Shift Catalyst | Outlet from High Temp. Shift Catalyst |
| CO | 47.90 | 31.09 | 3.35 |
| $H_2$ | 45.40 | 51.52 | 61.78 |
| $CO_2$ | 5.60 | 16.42 | 34.11 |
| $CH_4$ | 0.85 | 0.75 | 0.59 |
| $H_2S$ | 0.25 | 0.22 | 0.17 |
| | 100.00 | 100.00 | 100.00 |

EXAMPLE 2

The purpose of Example 2 is to show the optimum amount of Co-Mo shift catalyst in the first bed for the system described in Example 1. The activity and cost of the Co-Mo low temperature shift catalyst is about three times that of the chromium oxide promoted iron-oxide high temperature shift catalyst. Example 2 is related to Example 1, but in Example 2 the amount of Co-Mo shift catalyst in the first bed in the first stage is varied. All other conditions are substantially the same. The overall conversion of CO to $CO_2$ is 90 percent.

The drawings show the relationship between the total catalyst cost and the volume percent of Co-Mo low temperature shift catalyst in the first stage, i.e., 100 × volume of Co-Mo catalyst in first bed divided by total volume of catalyst in first stage.

With a feed gas temperature to the first bed of 500° F, as shown by the accompanying drawing, any amount of $Cr_2O_3$ promoted $Fe_2O_3$ shift catalyst in the first stage may be replaced by Co-Mo shift catalyst in order to reduce the total catalyst cost for both stages. From the drawing, the optimum volume % of Co-Mo shift catalyst in the first and second beds is a value in the range of about 24 to 50.

The process of the invention has been described generally and by example with reference to liquid hydrocarbon feedstocks, effluent gas streams and various other materials of particular compositions for purposes of clarity and illustration only. From the foregoing, it will be apparent to those skilled in the art that the various modifications of the process and the materials disclosed herein can be made without departure from the spirit of the invention.

We claim:

1. In a process for the production of hydrogen-rich gas stream by reacting a hydrocarbonaceous feed by partial oxidation with a free-oxygen containing gas in the presence of a temperature moderator in the reaction zone of a free-flow gas generator at a temperature in the range of about 1300° to 3500° F and a pressure in the range of about 1 to 250 atmospheres to produce a process gas stream comprising $H_2$, CO, $CO_2$, $H_2O$, particulate carbon, and optionally at least one gas selected from the group $CH_4$, $H_2S$, COS, $N_2$, and A; cooling and contacting said process gas stream with water in a gas cooling and scrubbing zone thereby removing said particulate carbon while introducing supplemental $H_2O$ to produce a shift feed gas stream for water-gas shift conversion having a mole ratio of $H_2O$ to CO in the range of about 1 to 5; the improvement comprising (1) without preheating introducing said shift feed gas stream from said cooling and scrubbing zone at a temperature in the range of about 350° to 550° F directly into a fixed bed of low temperature water-gas shift catalyst, comprising cobalt-molybdenum or copper-zinc oxides, and reacting therein a portion of the CO and $H_2O$ in said shift feed gas stream by exothermic water-gas shift reaction, thereby increasing the temperature of the process gas stream to a value in the range of about 600° to 710° F; (2) passing the process gas stream leaving step (1) without additional heating or cooling directly into a fixed bed of high temperature shift catalyst comprising iron oxide promoted by 1 to 15 weight percent of an oxide from the group Cr, Th, U, Be, and Sb; and wherein the volumetric ratio of low temperature shift catalyst to high temperature shift catalyst is in the range of about 0.05 to 0.5; and reacting together therein CO and $H_2O$ to produce additional $H_2$ and $CO_2$; and (3) removing the process gas stream from (2) at a temperature in the range of about 710° to 1000° F enriched in hydrogen.

2. The process of claim 1 wherein the low temperature and high temperature water-gas shift catalyst in steps (1) and (2) are in contiguous fixed beds.

3. The process of claim 1, wherein the process gas stream in step (1) contains in admixture 0.1 to 2.0 mole % $H_2S$.

4. The process of claim 1 wherein said low temperature and high temperature water-gas shift catalyst is kept in separate but interconnected fixed beds.

5. The process of claim 1 wherein the space velocity in said low temperature water-gas shift catalyst is in the range of about 5000 to 10,000 SCFH per $Ft_3$; and the space velocity in said high temperature water-gas shift catalyst is in the range of about 1000 to 4000 SCFH per $Ft.^3$.

6. The process of claim 1 wherein the pressure in the reaction zone of said partial oxidation gas generator is in the range of 8 to 135 atmospheres.

7. The process of claim 1 wherein the pressure in each of said steps is substantially the same as that in said gas generator less ordinary pressure drop in the lines and equipment.

8. The process of claim 1 with the additional steps of cooling the gas stream from step (3) to a temperature in the range of about 600° to 710° F; introducing the cooled gas stream into a second bed of high temperature water-gas shift catalyst for additional conversion of CO to $CO_2$; and removing a hydrogen-rich gas stream from said second bed of high temperature shift catalyst.

9. The process of claim 8 provided with the additional steps of cooling the stream of hydrogen-rich gas leaving the second bed of high temperature shift catalyst to a temperature in the range of about 350° to 550° F, and introducing said cooled gas stream into a second bed of low temperature shift catalyst; whereupon substantially all of the remaining CO is reacted.

10. The process of claim 8 wherein the overall conversion of CO to $CO_2$ is at least about 90 percent, and the volume percent of cobalt-molybdenum present is in the range of about 50 to 24 volume percent.

11. The process of claim 1 wherein said hydrocarbonaceous feed is selected from the group consisting of petroleum distillate and residua, gas oil, residual fuel, reduced crude, whole crude, asphalt, coal tar, coal oil, shale oil, tar sand oil, and mixtures thereof.

12. The process of claim 1 wherein said hydrocarbonaceous feed is a pumpable slurry of solid carbonaceous feed selected from the group consisting of coal, lignite, coal char, particulate carbon, petroleum coke, and mixtures thereof in $H_2O$ or in a liquid hydrocarbonaceous fuel.

13. The process of claim 1 wherein said hydrocarbonaceous feed is a liquid hydrocarbon material containing combined oxygen selected from the group consisting of alcohols, ketones, aldehydes, organic acids, esters, ethers, and mixtures thereof, optionally in admixture with a liquid petroleum material.

14. The process of claim 1 wherein said process gas stream contains less than about 10 parts per million of sulfur and chlorides, and said fixed bed of low temperature water-gas shift catalyst comprises copper and zinc oxides.

* * * * *